(12) United States Patent
Landa et al.

(10) Patent No.: US 7,772,144 B2
(45) Date of Patent: Aug. 10, 2010

(54) GLASS COMPOSITION FOR IMPROVED REFINING AND METHOD

(75) Inventors: Leonid M. Landa, Brownstown, MI (US); Ksenia A. Landa, Brownstown, MI (US); Richard Hulme, Rochester Hills, MI (US); Scott V. Thomsen, South Lyon, MI (US); Anthony V. Longobardo, Oak Grove, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 993 days.

(21) Appl. No.: 11/196,477

(22) Filed: Aug. 4, 2005

(65) Prior Publication Data

US 2007/0032368 A1 Feb. 8, 2007

(51) Int. Cl.
C03C 3/078 (2006.01)
C03C 3/087 (2006.01)

(52) U.S. Cl. ............................... 501/72; 501/70; 501/71

(58) Field of Classification Search .................. 501/70, 501/71, 72
See application file for complete search history.

(56) References Cited

U.S. PATENT DOCUMENTS

| | | | | |
|---|---|---|---|---|
| 4,812,423 | A * | 3/1989 | Kodama et al. | 501/55 |
| 5,059,561 | A * | 10/1991 | Ciolek et al. | 501/13 |
| 5,071,796 | A | 12/1991 | Jones et al. | |
| 5,091,345 | A * | 2/1992 | Becker | 501/14 |
| 5,403,664 | A * | 4/1995 | Kurahashi et al. | 428/426 |
| 5,776,844 | A * | 7/1998 | Koch et al. | 501/70 |
| 5,830,814 | A | 11/1998 | Combes | |
| 5,888,917 | A * | 3/1999 | Kawaguchi et al. | 501/70 |
| 5,958,812 | A * | 9/1999 | Koch et al. | 501/72 |
| 6,391,810 | B1 * | 5/2002 | Lenhart | 501/59 |
| 6,610,622 | B1 | 8/2003 | Landa et al. | |
| 6,716,780 | B2 | 4/2004 | Landa et al. | |
| 6,727,198 | B1 * | 4/2004 | Hashimoto et al. | 501/66 |
| 6,797,658 | B2 | 9/2004 | Pecoraro et al. | |
| 6,812,173 | B2 * | 11/2004 | Ishihara | 501/69 |
| 6,858,553 | B2 * | 2/2005 | Seto et al. | 501/70 |
| 6,878,652 | B2 | 4/2005 | Pecoraro et al. | |
| 7,026,753 | B2 * | 4/2006 | Futagami et al. | 313/493 |
| 7,309,671 | B2 * | 12/2007 | Kurachi et al. | 501/70 |
| 2002/0068678 | A1 * | 6/2002 | Seto et al. | 501/70 |
| 2003/0220183 | A1 * | 11/2003 | Kurachi et al. | 501/70 |
| 2004/0014586 | A1 * | 1/2004 | Otaki et al. | 501/35 |
| 2004/0067835 | A1 * | 4/2004 | Seto et al. | 501/64 |
| 2005/0245384 | A1 * | 11/2005 | Ito | 501/70 |

FOREIGN PATENT DOCUMENTS

| | | |
|---|---|---|
| EP | 1 338 575 | 8/2003 |
| EP | 1 403 224 | 3/2004 |
| JP | 60-161350 | 8/1985 |
| JP | 60-161352 | 8/1985 |
| JP | 02-221137 | 9/1990 |
| SU | 983090 | 12/1982 |
| SU | 1097572 | 6/1984 |

OTHER PUBLICATIONS

Derwent Abstract 1983-794097, English Abstract SU 983090 A. Dec. 23, 1982.*
Derwent Abstract 1985-011223, English Abstract SU 1097572 A. Jun. 15, 1984.*
Derwent Abstract 1985-245831, English Abstract JP 60161350 A. Aug. 23, 1985.*
Derwent Abstract 1985-245832, English Abstract JP 60161352 A. Aug. 23, 1985.*
Derwent Abstract 1990-310119, English Abstract JP 02221137 A. Sep. 4, 1990.*
International Search Report dated Nov. 3, 2006.

* cited by examiner

Primary Examiner—Karl E Group
Assistant Examiner—Elizabeth A Bolden
(74) Attorney, Agent, or Firm—Nixon & Vanderhye P.C.

(57) ABSTRACT

A soda-lime-silica based glass composition for manufacturing on a float line that has a faster refining rate due to the introduction of alkali earth oxides such as BaO, ZnO and/or SrO in the amount of from about 1-4% in total. These oxides replace part or all of the MgO in the base glass composition thereby decreasing the overall MgO content in the glass composition to about 2% or less. The glass can realize a lower viscosity at high temperatures so that refining of the melt may occur faster.

8 Claims, No Drawings

GLASS COMPOSITION FOR IMPROVED REFINING AND METHOD

This invention relates to a soda-lime-silica based glass composition for manufacturing on a float line that has a faster refining rate due to the introduction of alkali earth oxides such as BaO, ZnO and/or SrO in the amount of from about 1-4% in total. These oxides replace part or all of the MgO in the base glass composition thereby decreasing the overall MgO content in the glass composition to about 2% or less. The glass is able to realize a lower viscosity at high temperatures so that refining of the melt occurs faster in the float line manufacturing process. Such glass compositions are useful, for example and without limitation, in architectural, vehicular and/or residential glass window applications.

BACKGROUND OF THE INVENTION

This invention relates to glass compositions having improved refining and/or melting characteristics. In a conventional float line process, glass batch materials are heated in a furnace or melter to form a glass melt. The glass melt is poured onto a bath of molten tin (tin bath), where the glass melt is formed and continuously cooled to form a float glass ribbon. The float glass ribbon is cooled and cut to form solid glass articles, such as flat glass sheets. For float glass, the glass batch often includes soda, line and silica to form soda-lime-silica based flat glass.

Glass composition properties can be defined based on their temperature and viscosity characteristics. For example, the melting temperature of a glass is often defined as the temperature at which the glass has a viscosity of 100 poises, which is often referred to as the temperature of the log 2 viscosity.

There is a tradeoff between glass production and the cost of manufacture. In particular, it is desirable to increase the rate of glass production but at the same time it is also desirable to reduce production costs. Certain glass manufacturers are operating their glass furnaces at higher and higher throughput and temperatures to meet the increased demand for glass. However, as more glass batch is processed, more fuel is required to melt the increased amounts of glass batch thereby increasing production costs and decreasing thermal efficiency.

Certain prior art has attempted to solve these problems. For example, U.S. Pat. No. 6,797,658 (the disclosure of which is hereby incorporated herein byh reference) discloses decreasing the amount of MgO in the glass composition and increasing the amount of two or more of CaO, $R_2O$ ($Na_2O$ and $K_2O$), $Al_2O_3$, and $SiO_2$ by the same amount. The '658 Patent contends that the melting and/or forming temperature of the glass can be reduced in such a manner. See also U.S. Pat. Nos. 6,878,652 (decreasing MgO and increasing CaO by the same amount), and 5,071,796, the disclosures or which are hereby incorporated herein by reference. However, these compositions are problematic for numerous reasons and do not provide for the best results.

In view of the above, it will be apparent that there exists a need in the art for a soda-lime-silica based glass composition which may realize a lower melting point and/or lower temperature(s) of forming, and/or a lower liquidus temperature. In certain example instances it would be desirable to provide a glass composition that is able to realize a lower viscosity at high temperatures so that refining of the melt occurs faster in the float line manufacturing process, and./or a method of making such glass.

SUMMARY OF EXAMPLE EMBODIMENTS OF THE INVENTION

Certain example embodiments of this invention relate to a soda-lime-silica based glass composition for manufacturing on a float line that has a faster refining rate due to the introduction of alkali earth oxides such as BaO, ZnO and/or SrO in the amount of from about 1-4% in total. These oxides replace part or all of the MgO in the base glass composition thereby decreasing the overall MgO content in the glass composition to about 2% or less. The glass is able to realize a lower viscosity at high temperatures so that refining of the melt occurs faster in the float line manufacturing process. Such glass compositions are useful, for example and without limitation, in architectural, vehicular and/or residential glass window applications.

In certain example embodiments, each of SrO, BaO and ZnO is provided in the glass batch in an amount of at least about 0.5% each (more preferably at least about 0.75% each and most preferably at least about 1% each) and in the final resulting glass product, with the total of all these materials not exceeding about 4% by weight in the glass batch and/or final glass product. In other example embodiments of this invention, only two of these materials may be used in the glass batch and final glass product, in the same quantities mentioned above.

DETAILED DESCRIPTION OF CERTAIN EXAMPLE EMBODIMENTS OF THIS INVENTION

Grey glasses according to different embodiments of this invention may be used, for example, as windows in the automotive industry (e.g., windshields, backlites, sidelites, etc.), in architectural applications, and/or in other suitable applications.

Certain glasses according to this invention utilize soda-lime-silica glass as their base composition/glass, to which are added certain ingredients that are provided in order to cause the glass to have a lower viscosity at high temperatures so that refining of the melt occurs faster. In particular, it has surprisingly been found that the addition of BaO, ZnO and SrO to the glass batch (and in the final glass product) in an amount totaling no more than about 4% by weight in the batch and/or glass, while simultaneously reducing the amount of MgO in the glass batch and/or glass by a similar amount causes the glass to realize a lower viscosity at high temperatures so that refining of the melt occurs faster in the float line manufacturing process.

In certain example embodiments of this invention, the targeted properties are lower viscosity and higher thermal expansion compared to regular float glass, that is, a linear thermal expansion coefficient range, $\alpha=(9.6 \text{ to } 10.4)\times10^{-6} \text{ K}^{-1}$.

In certain example embodiments, each of SrO, BaO and ZnO is provided in the glass batch and/or final glass in an amount of at least about 0.5% each (more preferably at least about 0.75% each and most preferably at least about 1% each), with the total of all these materials not exceeding about 4% by weight in the glass batch and/or final glass. In other example embodiments of this invention, only two of these materials may be used in the glass batch and final glass product, in the same quantities mentioned above. For instance, in an example of such another embodiment, SrO and ZnO may be provided in the batch and/or final glass, in amounts of at least about 0.5% each (more preferably at least about 0.75% each and most preferably at least about 1% each), with the total of all these two materials not exceeding about 4% by weight in the glass batch and/or final glass. As another example of such another embodiment, SrO and BaO may be used as the two alkali earth oxide materials. It is also possible that only one of these alkali earth oxides is provided in an amount of from about 1-4% in certain alternative embodiments of this invention.

This patent refers to BaO, ZnO and SrO. However, the use of these terms does not mean that the stoichiocmetries of these materials are limited to the same amount of each element. Instead, there terms are meant to include herein any suitable stoichiometry of these materials. As an example, "SrO" is not limited to a one to one ratio of Sr (strontium) to O (oxygen). As another example, "BaO" is not limited to a one to one ratio of Ba (barium) to O (oxygen). Likewise, "ZnO" is not limited to a one to one ratio of Zn (zinc) to O (oxygen).

An example soda-lime-silica base glass according to certain embodiments of this invention, on a weight percentage basis, includes the following basic ingredients:

TABLE 1

Example Base Glass

| Ingredient | Wt. % |
|---|---|
| $SiO_2$ | 67-75% |
| $Na_2O$ | 10-20% |
| CaO | 5-15% |
| MgO | 0-3% |
| $Al_2O_3$ | 0-7% |
| $K_2O$ | 0-7% |

Other minor ingredients, including various refining aids, such as salt cake, crystalline water and/or the like may also be included in the base glass. In certain embodiments, for example, glass herein may be made from batch raw materials silica sand, soda ash, dolomite, limestone, with the use of salt cake ($SO_3$) as a refining agent. Reducing agent(s) such as Si (metallic) (Si), silicon monoxide (SiO), sucrose, and/or carbon may also be used. In certain instances, soda-lime-silica base glasses herein include by weight from about 10-15% $Na_2O$ and from about 6-12% CaO. While a soda-lime-silica base glass set forth above is preferred in certain embodiments of this invention, this invention is not so limited.

In certain example embodiments of this invention, in addition to the base glass materials listed above, one, two or all three of BaO, ZnO and/or SrO are included in the base glass in order to lower the viscosity of the glass at high temperatures so that refining of the meot occurs faster. While there material(s) are added to the base glass, the amount of MgO in the base glass is simultaneously reduced. In particular, it has been found that the best results are achieved when the total amount of MgO in the final glass (and in the glass batch) is no more than about 3% (by weight), more preferably no greater than about 2%. In other words, the BaO, ZnO and/or SrO replaces MgO in the glass.

For purposes of example only, the below-listed ranges in hypothetical examples are provided for the aforesaid materials BaO, ZnO and SrO in the glass batch and resulting glass (in addition to the base materials listed in Table 1 above).

TABLE 2

Example Ranges

| | SrO | ZnO | BaO |
|---|---|---|---|
| Example 1 | 1% | 1% | 1% |
| Example 2 | 1.25% | 1.25% | 1.25% |
| Example 3 | 1-4% | 0 | 0 |
| Example 4 | 0 | 1-4% | 0 |
| Example 5 | 0 | 0 | 1-4% |
| Example 6 | 1-2% | 1-2% | 0 |
| Example 7 | 0.5-3% | 0.5-3% | 0 |
| Example 8 | 1-2% | 0 | 1-2% |
| Example 9 | 0.5% | 0.5% | 1% |
| Example 10 | 0.75% | 2% | 0 |

In addition to the base glass materials discussed above (which includes the alkali earth oxides listed above), the glass batch and/or final glass may include a colorant portion including material(s) such as iron, erbium, cobalt, selenium and/or the like. In certain example embodiments of this invention, the amount of total iron in the glass may be from about 0.2 to 1.2%, more preferably from about 0.3 to 0.8%. The total amount of iron present in the glass, and thus in the colorant portion thereof, is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass (i.e., glass redox), which is expressed as the ratio FeO/ $Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Iron in the ferrous state ($Fe^{2+}$; FeO) is a blue-green colorant, while iron in the ferric state ($Fe^{3+}$) is a yellow-green colorant. According to certain embodiments of this invention, the colorant portion of the glass composition herein is characterized by a glass redox value (i.e., $FeO/Fe_2O_3$) of from about 0.15 to 0.35.

In certain example embodiments herein, glasses may be characterized by one or more of the optical characteristics set forth below when measured at a nominal thickness of from 1-6 mm, more preferably from about 3-4 mm (about 3 or 4 mm may be used for a reference thickness in certain example non-limiting embodiments, or about 0.219 inch thickness of glass may be used). The color values are transmissive, in accordance with the known x/y CIE color diagram.

TABLE 3

Example Optical Characteristics

| Characteristic | Preferred | More Preferred | Most Preferred |
|---|---|---|---|
| Lta (visible transmittance): | 8-90% | 60-90% | 70-85% |
| Dominant Wavelength (λ): | 400-600 nm | n/a | n/a |

Once given the above disclosure many other features, modifications and improvements will become apparent to the skilled artisan. Such features, modifications and improvements are therefore considered to be a part of this invention, the scope of which is to be determined by the following claims:

What is claimed is:

1. A glass comprising:
a base glass portion of the glass comprising:

| Ingredient | wt. % |
|---|---|
| SiO$_2$ | 67-75% |
| Na$_2$O | 10-20% |
| CaO | 5-15% |
| Al$_2$O$_3$ | 0-7% |
| K$_2$O | 0-7% | and wherein the glass is a float glass, and further comprises ZnO, BaO, and from 1 to 4% SrO and no more than about 2.0% MgO, and wherein the sum total of the SrO, ZnO and BaO in the glass is from about >1-4% and the glass contains no more than 1.25% BaO, so as to lower viscosity at high temperatures so that refining occurs faster.

2. The glass of claim 1, wherein the glass comprises from about 2-4% SrO.

3. The glass of claim 1, wherein the glass further comprises at least 0.5% ZnO and/or at least 0.5% BaO, and wherein the total sum of SrO, ZnO and BaO in the glass is no more than about 4.0% by weight.

4. A glass comprising:
a base glass portion of the glass comprising:

| Ingredient | wt. % |
|---|---|
| SiO$_2$ | 67-75% |
| Na$_2$O | 10-20% |
| CaO | 5-15% |
| Al$_2$O$_3$ | 0-7% |
| K$_2$O | 0-7% | and wherein the glass is a float glass, and further comprises each of SrO, ZnO and BaO, wherein the sum total of the SrO, ZnO and BaO in the glass is from about 1-4% by weight and the glass contains no more than 1.25% BaO, and wherein the glass contains no more than about 2.0% MgO, so as to lower viscosity at high temperatures so that refining occurs faster.

5. The glass of claim 4, wherein the glass comprises at least 1% SrO.

6. The glass of claim 4, wherein the glass further comprises at least 0.5% ZnO, and/or at least 0.5% BaO.

7. A glass comprising:
a base glass portion of the glass comprising:

| Ingredient | wt. % |
|---|---|
| SiO$_2$ | 67-75% |
| Na$_2$O | 10-20% |
| CaO | 5-15% |
| Al$_2$O$_3$ | 0-7% |
| K$_2$O | 0-7% | and wherein the glass is a float glass, and further comprises at least two of SrO, ZnO and BaO, wherein the sum total of the SrO, ZnO and BaO in the glass is from about 1-4% by weight and the glass contains no more than 1.25% BaO, and wherein the glass contains no more than about 2.0% MgO, so as to lower viscosity at high temperatures so that refining occurs faster.

8. The glass of claim 7, wherein the glass comprises at least 0.5% SrO.

* * * * *